US012645007B2

(12) United States Patent
Flesche

(10) Patent No.: US 12,645,007 B2
(45) Date of Patent: Jun. 2, 2026

(54) ESTIMATING PRIMARY AND SECONDARY ACOUSTIC VELOCITIES IN ROCK

(71) Applicant: Equinor Energy AS, Stavanger (NO)

(72) Inventor: Harald Flesche, Nesttun (NO)

(73) Assignee: EQUINOR ENERGY AS, Stavanger (NO)

( * ) Notice: Subject to any disclaimer, the term of this patent is extended or adjusted under 35 U.S.C. 154(b) by 401 days.

(21) Appl. No.: 18/026,209

(22) PCT Filed: Sep. 10, 2021

(86) PCT No.: PCT/NO2021/050187

§ 371 (c)(1),
(2) Date: Mar. 14, 2023

(87) PCT Pub. No.: WO2022/060227

PCT Pub. Date: Mar. 24, 2022

(65) Prior Publication Data

US 2023/0358916 A1    Nov. 9, 2023

(30) Foreign Application Priority Data

Sep. 15, 2020    (GB) ..................................... 2014497

(51) Int. Cl.
*G01V 11/00*        (2006.01)
*E21B 49/00*        (2006.01)
(52) U.S. Cl.
CPC ............ *G01V 11/002* (2013.01); *E21B 49/00* (2013.01); *E21B 2200/20* (2020.05)
(58) Field of Classification Search
CPC .......................... E21B 2200/20; G01V 11/002
See application file for complete search history.

(56) References Cited

U.S. PATENT DOCUMENTS 6,374,185 B1 * 4/2002 Taner ....................... G01V 1/40
702/14

9,852,373 B2 * 12/2017 De Stefano .............. G06N 3/04
(Continued)

FOREIGN PATENT DOCUMENTS

CN          109611087 A  *  4/2019  ............. E21B 49/00
GB          2481757 A       1/2012
WO    WO 2013/074593 A1    5/2013

OTHER PUBLICATIONS

Al-Dousari et al., "Investigating the dependence of shear wave velocity on petrophysical parameters," Journal of Petroleum Science and Engineering, vol. 146, Apr. 2016, pp. 286-296.
English translation of the Brazilian Technical Report for Brazilian Application No. BR112023004428-6, dated Sep. 18, 2024.
Li et al., "Investigation the relationship between nuclear magnetic resonance and acoustic velocity for improving the evaluation of tight gas reservoirs," Energy Sources, Part A: Recovery, Utilization, and Environmental Effects, Oct. 26, 2020, pp. 1-10.

(Continued)

*Primary Examiner* — Stephanie E Bloss
(74) *Attorney, Agent, or Firm* — Birch, Stewart, Kolasch & Birch, LLP

(57)                    ABSTRACT

A method of estimating the primary and secondary acoustic velocities, Vp and Vs, of formation surrounding a first wellbore includes obtaining well logging data for a multiplicity of other wellbores to collect, for each other wellbore a plurality of input data sets including at least a Nuclear Magnetic Resonance logging data set, and an element composition scanning data set. The operation further collects, for each other wellbore, at least one output data set including a primary and secondary velocity data set. The method incudes training or establishing at least one regression model using said input and output data sets, obtaining well logging data for said first wellbore to obtain a corresponding plurality of input data sets, and applying the obtained corresponding plurality of input data sets to the trained or established regression model to generate as an output of the regression model, an output data set for the first wellbore including a primary and secondary velocity data set.

5 Claims, 2 Drawing Sheets

(56)　　　References Cited

U.S. PATENT DOCUMENTS

| | | | | |
|---|---|---|---|---|
| 10,754,050 | B2 * | 8/2020 | Kacewicz | G01V 1/301 |
| 2003/0021184 | A1 | 1/2003 | Zhang | |
| 2005/0206378 | A1 * | 9/2005 | Hamdan | G01V 3/32 |
| | | | | 324/303 |
| 2009/0213692 | A1 | 8/2009 | Martinez et al. | |
| 2010/0305865 | A1 | 12/2010 | Bachrach et al. | |
| 2011/0208431 | A1 * | 8/2011 | Skelt | G01V 20/00 |
| | | | | 702/7 |
| 2011/0218737 | A1 * | 9/2011 | Gulati | G01V 1/30 |
| | | | | 345/419 |
| 2011/0295510 | A1 * | 12/2011 | Gulati | G01V 1/288 |
| | | | | 345/419 |
| 2012/0037423 | A1 | 2/2012 | Geerits et al. | |
| 2013/0289962 | A1 * | 10/2013 | Wendt | G01V 1/306 |
| | | | | 703/10 |
| 2018/0284305 | A1 * | 10/2018 | Kacewicz | G01V 20/00 |

OTHER PUBLICATIONS

Martins et al., "Use of Nuclear Magnetic Resonance (NMR) technique for petrophysical characterization of coquinas from the Morro do Chaves Formation, Sergipe-Alagoas Basin," Federal University of Rio de Janeiro (UFRJ), Sep. 20, 2018, 8 pages total, with an English translation.

International Search Report, issued in PCT/NO2021/050187, dated Dec. 6, 2021.

United Kingdom Combined Search and Examination Report, issued in Priority Application No. 2014497.8, dated Feb. 22, 2021.

Written Opinion of the International Searching Authority, issued in PCT/NO2021/050187, dated Dec. 6, 2021.

Dalvand et al., "A new rock physics model to estimate shear velocity log," Journal of Petroleum Science and Engineering, vol. 196, 2021, pp. 1-10.

* cited by examiner

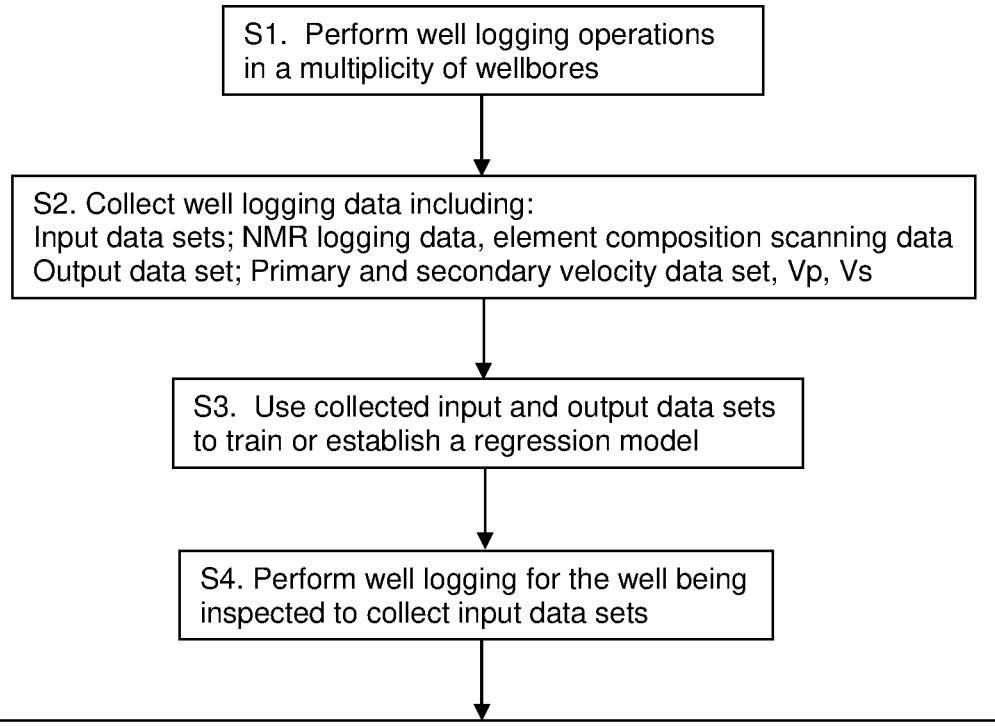

S1.  Perform well logging operations in a multiplicity of wellbores

S2. Collect well logging data including:
Input data sets; NMR logging data, element composition scanning data
Output data set; Primary and secondary velocity data set, Vp, Vs S3.  Use collected input and output data sets to train or establish a regression model S4. Perform well logging for the well being inspected to collect input data sets S5.  Apply input data sets for the well being inspected to the trained or established regression model to generate an output data set including Vp and Vs

Figure 1

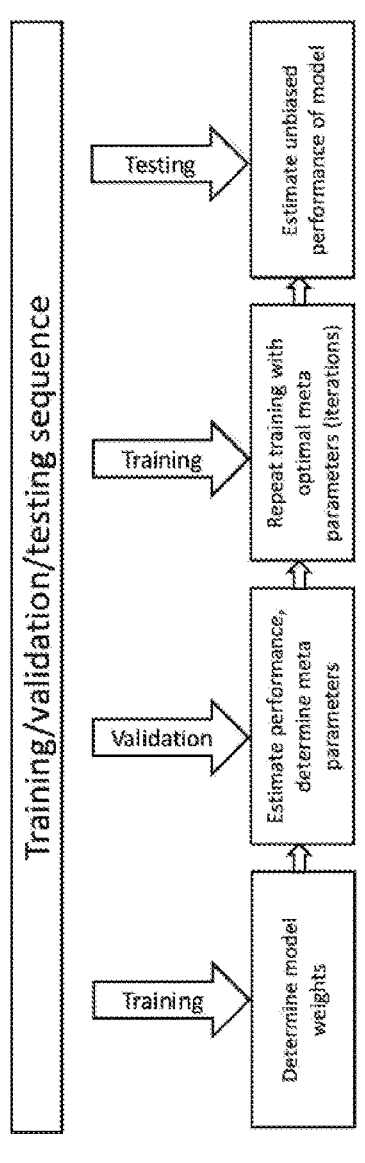
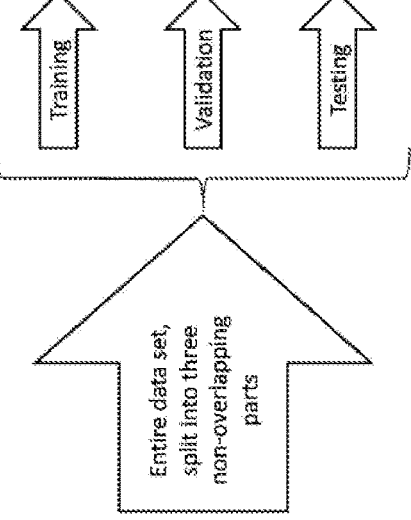
Figure 2

ESTIMATING PRIMARY AND SECONDARY ACOUSTIC VELOCITIES IN ROCK

TECHNICAL FIELD

The present invention relates estimating pressure and shear velocities, Vp and Vs, in rocks beneath a surface of the Earth.

BACKGROUND

Seismic surveying is commonly used to obtain three-dimensional information in relation to sub-surface regions of the Earth. Such information can be used, for example, to identify potentially hydrocarbon bearing formations and to monitor hydrocarbon producing formations. In this context, two types of seismic waves are of interest, namely P waves and S waves. P waves, or Primary waves, are compressional waves that are longitudinal in nature. These are pressure waves that can travel through any type of material including fluids. S waves, or Secondary waves, are shear waves that are transverse in nature and cannot travel any distance through fluids. They travel more slowly through solid materials than P waves, hence the name ("Secondary"). As S waves cannot travel through fluids, they can only truly be detected by receivers that are mechanically coupled to the seabed. Sophisticated processing techniques have been developed to make use of detected S and P waves to image subsea regions and in particular to detect and monitor hydrocarbon bearing formations.

Whilst, traditionally, P waves have been detected using arrays of sources and receivers towed in the water, both P and S waves can be monitored by measuring two physical effects at the seabed, namely pressure and particle velocity or particle acceleration. These measured physical effects may be analyzed using complex algorithms in order to detect and separate the P and S waves. Traditionally, seismic seabed surveys have been conducted using arrays of so-called 4c sensors, each of which monitors four components, namely pressure and three orthogonal components of particle velocity (x, y and z), or particle acceleration, using a single hydrophone and three orthogonally-oriented geophones. More recently, it has been appreciated that additional data-including pressure derivatives in the horizontal plane (x and y directions) and the particle velocity derivatives in the horizontal plane (x and y directions)—can prove valuable in monitoring the P and S waves, resulting in higher quality (e.g. higher resolution) data and added value in subsurface mapping. [The terms "gradients" and "derivatives" are used interchangeably in the technical literature.]

Of particular interest when it comes to identifying and monitoring hydrocarbon bearing formations are the velocities of the S and P waves, Vs and Vp, in the subsurface region being imaged. In order to estimate these velocities using the recorded data (amplitude and direction of the observed S and P waves as measured at the sensors), a process known as inversion is used. Put very simply, inversion aims to iteratively generate a rock velocity model that, when subjected to a simulation of the actual input seismic energy, e.g. explosions generated at the surface or in the water above the surface, produces S and P waves matching the detected S and P waves.

In order to generate accurate results, the starting point for the inversion process must be a reasonable first approximation model of the S and P wave acoustic velocities. Such a model is created using multiple data sets including, for example, well log data obtained from wells drilled into the region under investigation, prior seismic survey data, and input from geologists having knowledge of the Earth's structure. Considering further the well log data, one could obtain core samples along the entire length of the well and thereby directly obtain rock samples from which acoustic velocities are determined. In practice however this is impossible due to the cost and complexity of coring operations. Rather, the well log data comprises data collected by sensors during a drilling operation or during subsequent well logging operations. Even though such data is essentially one-dimensional, i.e. extending along the length of the well, extrapolation can be used to infer properties of the regions surrounding the well.

Sonic well logs are typically acquired with industry standard logging tools, either as LWD (logging while drilling) or WL (wireline) tools. Service companies including Schlumberger™ or Baker-Hughes™ provide such services. A sonic tool sends an acoustic wave into the formation at one point (source) and the wave travels through the rocks until reaching one or more receiver on the sonic tool, some distance away from the source. The travel time from source to receiver is recorded, and formation velocity can be calculated. Different modes of acoustic waves and arrays of receivers make it possible to estimate both P- and S-wave acoustic velocity.

For any given well, data collected by sonic well log tools may be inaccurate or incomplete, resulting in data "gaps" along the length of the well.

SUMMARY

According to a first aspect of the present invention there is provided a method of estimating the primary and secondary acoustic velocities, Vp and Vs, of formation surrounding a first wellbore. The method comprises obtaining well logging data for a multiplicity of other wellbores to collect, for each other wellbore a plurality of input data sets including at least a Nuclear Magnetic Resonance logging data set, and an element composition scanning data set. The operation further collects, for each other wellbore, at least one output data set including a primary and secondary velocity data set. The method comprises training or establishing at least one regression model using said input and output data sets, obtaining well logging data for said first wellbore to obtain a corresponding plurality of input data sets for the first wellbore, and applying the obtained corresponding plurality of input data sets for the first wellbore to the trained or established regression model to generate as an output of the regression model, an output data set for the first wellbore including a primary and secondary velocity data set for the first wellbore.

The regression model may be a machine learning model, for example a neural network. Alternatively, the regression model may be a Ridge regression or randomised tree regression model.

The method is applicable to formations consisting of carbonate rock as well as to other formation types.

The steps of obtaining well logging data for said other wells and said first well may comprise performing well logging operations for those wells.

According to a second aspect of the present invention there is provided a method of creating a three-dimensional image of a subsurface region of the Earth. The method comprises performing the method of any one of the preceding claims to obtain an output data set for the first wellbore including a primary and secondary velocity data set for one or more first wellbores in said region. The or each output data set is used to create an initial acoustic velocity model of said region. Seismic survey data for said region is obtained, and a seismic inversion method applied to said seismic survey data using said initial acoustic velocity model to generate said three-dimensional image. The seismic survey data may be obtained by performing a seismic surveying operation.

BRIEF DESCRIPTION OF THE DRAWINGS

FIG. 1 is a flow diagram illustrating a method of establishing a regression model, and of using that model to generate Vp and Vs data for a well; and FIG. 2 illustrates schematically a process of training a regression model using data sets obtained from one or more wells.

DETAILED DESCRIPTION

Carbonate rocks are a class of sedimentary rocks composed primarily of calcium carbonate minerals. The two major types are limestone, which is composed of calcite or aragonite, and dolomite rock, also known as "dolostone", which is composed of the mineral dolomite. Carbonate rocks may be formed by several processes, the most common being a combination of sedimentary and biological. There are also carbonate rocks formed by purely chemical processes. Subtle changes in mineralogical composition are used to understand their formation and are established by physical and chemical measurements. All carbonate rocks may be altered by secondary processes, modifying their primary chemical composition and their physical properties. Due to the variability in their formation and the reactivity of the initial mineralogy, carbonate rocks often have complex pore structures. The pore structures and sizes vary more for these rocks than for clastic lithologies and influence physical properties of the rock. Rock physics models for carbonates are more complex than those for sandstones, and it is assumed that the shape of pores plays an important role in addition to overall porosity and mineral properties. A new method of determining acoustic velocities for rock, and specifically for carbonate rocks, will now be described.

Nuclear Magnetic Resonance (NMR) logging is a known technique that measures the induced magnet moment of hydrogen nuclei (protons) contained within the fluid-filled pore space of reservoir rocks. Unlike conventional logging measurements (e.g., acoustic, density, neutron, and resistivity) which respond to both the rock matrix and fluid properties and are strongly dependent on mineralogy, NMR-logging measurements respond to the presence of hydrogen protons. Because these protons primarily occur in pore fluids, NMR effectively responds to the volume, composition, viscosity, and distribution of these fluids. Importantly, NMR logging data is strongly correlated with the volume (porosity) of the rock pore space. Whilst it is not believed that NMR logging data has been used previously in determining acoustic velocities in rock, this strong correlation suggests that it may be useful to do this, particularly for carbonate rocks.

Another data set that might usefully be used to determine acoustic velocities is obtained by an element scanner such as a tool performing gamma ray logging. A passive logging tool is one that examines gamma rays generated naturally within the rock (surrounding a well). An active logging tool on the other hand, such as the Litho Scanner™ provided by Slumberger, is one that emits neutrons and reads the spectra of gamma rays coming from orbit transitions in the elements making up the minerals. Both passive and active logging tools are able to measure key elements in rock formations as well as make a quantitative determination of total organic carbon.

As well as the already noted NMR logging and spectral analysis data sets, one or more of the following data sets may additionally be used: bulk density log, derived/interpreted logs such as water saturation, total porosity and shale volume.

In order to be able to establish a relationship between the collected data sets and the acoustic velocities, Vs and Vp, training data is used. This involves, for each measurement point, i.e. distance along the well, the corresponding data of the collected data sets, and the known Vs and Vp from sonic logs at the measurement point. A regression method is applied to the data to determine the relationship. In a preferred embodiment, the relationship is provided by way of a trained neural network. Considering this further, an example system that may be used is Keras, which is an open source deep learning API.

An important point to note is that, as well as neural networks, other regression methods have been applied including other machine learning methods, and that all have provided good results. This indicates that there is a strong correlation between input data and the targets for the modelling, Vp and Vs. If the specific choice of regression model was very important to make the model work, this could indicate only a weak correlation.

A general approach to estimating Vp and Vs in a formation is illustrated in FIG. 1. This may form part of a larger project including generating a three-dimensional acoustic velocity model of a subsurface region of the Earth, where the illustrated method is performed as part of establishing an initial velocity model subsequently used for seismic inversion.

Statistical analysis suggests that available data should be divided into three parts: training, validation and testing. Training data is used for determining the weights, factors etc. that are needed in order to map input values to the modelled parameters (e.g. to obtain the weights of nodes in a neural network). Validation data is used to estimate the performance of the trained model, but as an intermediate result. Validation also includes optimization of meta-parameters for the regression models, such as the number of nodes in a neural network, the penalty for high weights in multi-linear regression etc. A model that is trained and validated is regarded as being optimal (given the training and data set available). Test data is an objective way to find how the model will perform in light of new data to which it has never before been exposed. This approach is illustrated in FIG. 2.

As already suggested above, in dealing with regression and classification problems, a useful "rule of thumb" is that the results should be relatively independent of the method used where there is a strong link between the input variables and the result that is sought. If the result is very dependent on the choice of method, this can indicate that there is a weak or spurious correlation between inputs and required results. Three exemplary regression methods might be selected:

Ridge regression (or Tikhonov regularisation): essentially a multi-linear regression, but with the added constraint that the weights for the input variables should be low, and they are penalised by a selected factor (a hyperparameter optimised during the validation step). Ridge regression is simple, robust and easily analysed. It may not however be able to handle non-linear relationship between inputs and results Sequential neural network: a network optimised for number of hidden layers, nodes in each layer, activation function and epochs, to balance performance and overfitting. A neural network may be able to handle non-linearities, but it may not be possible to find an analytic relationship between the inputs and results using the network.

Extremely randomised trees: an ensemble of regression decision trees, closely connected to a random forest algorithm, but with added randomness in the selection of features at each split. There are a few hyperparameters to tune for optimal performance, including number of trees, how individual trees should be "pruned" to reduce overfitting, and how many variables should be selected at each node in the trees. Although this method is more computationally complex than Ridge regression, it is less complex than a neural network approach.

This selection should ensure regression methods which vary in their basic assumptions, have an ability to handle complex systems, and are efficient in terms of computation time. Selection of a best regression method will be a result of a more thorough data analysis on a wider range of cases.

The chosen regression method or methods fit into an overall workflow that might be considered general for data analysis, with further steps that should be included to ensure that the models are built on the most coherent set of data for training, validation and testing. Such a workflow might be as follows:

Cleaning data: Remove all invalid data points from the initial data, i.e., all points for which the total set of input values are not valid measurements.

Remove outliers: Detect values that are not likely to be measurements of high confidence and eliminate them from the training and validation data sets. Use principal component analysis for compression of information into as few components as possible, both for the outlier detection and for visualisation. Note: The regression input consists of the original variables; the principal component analysis is only used in the outlier detection.

Variable selection: Evaluation of all variables to determine if they contribute significantly to the overall ability to estimate Vp and Vs through the regression method.

Transformation of categorical variables to dummy variables: As class variables (as determined by processes outside of the wellbore logging) can be used as inputs, they need to be transformed to a set of binary variables, one for each of the classes. This is known as one-hot-encoder. Examples of class variable are rock types as determined by geologists.

Scaling of variables: the regression methods will have best performance if all input variables are scaled to the same normalised value range, either zero to one, or minus one to one.

It will be appreciated by the person of skill in the art that various modifications may be made to the above described embodiments without departing from the scope of the present invention. For example, whist the discussion above has concentrated on estimating Vs and Vp in carbonates, the approach may also be useful to determine these properties in other formation types, e.g. volcanics and clastics. It will also be appreciated that, whilst the above discussion concerned a method of estimating Vp and Vs along an entire length of a well using a trained or established regression method, a similar approach may be used to "fill in" gaps in data obtained using another method (e.g. sonic well logging) that is either missing or identified as erroneous. The disclosed approach may also be used to test the dependence of Vp and Vs on the input data, e.g. by varying selected inputs, to classify geological structures, and to detect inconsistencies in the calibration of input logs (due to the predicted and measured velocities being very different).

The invention claimed is:

1. A method of generating a three-dimensional acoustic velocity model for a subsurface region of the Earth, the method comprising:

obtaining well logging data for a multiplicity of wellbores to collect, for each wellbore, a plurality of training input data sets including at least:

a Nuclear Magnetic Resonance (NMR) logging data set, and an element composition scanning data set, and at least one training output data set including a primary and secondary velocity data set, training or establishing at least one regression model using said training input data sets and output training data sets, wherein the plurality of training input data set and the at least one training output data set are correlated;

obtaining seismic survey data for said subsurface region;

estimating, for a first wellbore, first wellbore primary and secondary acoustic velocities, Vp and Vs, of formation surrounding the first wellbore by:

performing well logging operations in the first wellbore to obtain a corresponding plurality of first wellbore input data sets comprising NMR logging data set and element composition scanning data set for the first wellbore; and applying the obtained corresponding plurality of first wellbore input data sets to the trained or established regression model to generate as an output of the regression model, a first wellbore output data set for the first wellbore including a primary and secondary velocity data set for the first wellbore;

creating an initial acoustic velocity model for the formation surrounding the first wellbore using the first wellbore output data set; and applying a seismic inversion method to the seismic survey data and the initial acoustic velocity model to generate said three-dimensional acoustic velocity model.

2. The method according to claim 1, wherein said regression model is a machine learning model.

3. The method according to claim 2, wherein said regression model is a neural network.

4. The method according to claim 1, wherein said regression model is a Ridge regression or randomised tree regression model.

5. The method according to claim 1, wherein said formation is or consists of carbonate rock.

\* \* \* \* \*